United States Patent
Yang et al.

(10) Patent No.: US 6,175,677 B1
(45) Date of Patent: Jan. 16, 2001

(54) OPTICAL FIBER MULTI-RIBBON AND METHOD FOR MAKING THE SAME

(75) Inventors: Houching M. Yang, Conover, NC (US); Magnus Gunnarsson, Grimsas (SE)

(73) Assignee: Alcatel, Paris (FR)

( * ) Notice: Under 35 U.S.C. 154(b), the term of this patent shall be extended for 0 days.

(21) Appl. No.: 09/062,056

(22) Filed: Apr. 17, 1998

(51) Int. Cl.$^7$ .................................................. G02B 6/44
(52) U.S. Cl. ................................................................ 385/114
(58) Field of Search ..................... 385/100–114

(56) References Cited

U.S. PATENT DOCUMENTS

| | | | |
|---|---|---|---|
| 4,592,985 | 6/1986 | Choi et al. | 385/114 |
| 4,642,480 | 2/1987 | Hughes et al. | 307/147 |
| 4,680,423 | 7/1987 | Bennett et al. | 174/36 |
| 4,828,349 | 5/1989 | Nakasuji | 350/96.33 |
| 4,953,945 | 9/1990 | Nishimura et al. | 385/114 |
| 4,980,007 | 12/1990 | Ferguson | 156/179 |
| 5,067,830 | * 11/1991 | McAlpine et al. | 385/114 |
| 5,442,722 | 8/1995 | DeCarlo | 385/114 |
| 5,446,821 | 8/1995 | Nonaka et al. | 385/128 |
| 5,486,654 | 1/1996 | Hanak et al. | 174/36 |
| 5,524,164 | 6/1996 | Hattori et al. | 385/114 |
| 5,668,912 | 9/1997 | Keller | 385/114 |
| 5,717,805 | 2/1998 | Stulpin | 385/114 |
| 5,737,470 | 4/1998 | Nagano et al. | 385/114 |
| 5,761,363 | 6/1998 | Mills | 385/114 |
| 5,905,835 | * 5/1999 | Bourghelle et al. | 385/114 |

FOREIGN PATENT DOCUMENTS

| | | |
|---|---|---|
| 0636913 | 2/1995 | (EP) . |
| 0647866 | 4/1995 | (EP) . |
| 0407004 | 8/1996 | (EP) . |
| 0780712 | 6/1997 | (EP) . |
| 1271715 | 10/1989 | (JP) . |
| 5232361 | 9/1993 | (JP) . |

OTHER PUBLICATIONS

Design and Performance of a High–Capacity, Compact, Modular Ribbon Cable Comprising 24 Fiber Ribbons, K.W. Jackson, R.J. Brown, M.D. Kinard, K.M. Kroupa, M.R. Santana, P.M. Thomas in International Wire & Cable Symposium Proceedings 1996, p. 623.

Development of 3000–Fiber Cable Using 16–Fiber Ribbons, H. Iwata, M. Nozawa, N. Kashima, T. Tanifuji in International Wire & Cable Symposium Proceedings 1996, p. 638.

(List continued on next page.)

*Primary Examiner*—Hung N. Ngo
(74) *Attorney, Agent, or Firm*—Ware, Fressola, Van der Sluys & Adolphson LLP

(57) ABSTRACT

An optical fiber multi-ribbon and method for making the same is disclosed. The optical fiber multi-ribbon comprises N, where N is an integer greater than one, optical fiber ribbon members arranged in a common plane. Each of the N optical fiber ribbon members further comprise a plurality of optical fibers arranged in a planar array and an ultraviolet light curable primary matrix ribbonizing layer enveloping the plurality of optical fibers. The material forming the primary matrix ribbonizing layer of at least one of the N optical fiber ribbon members has a surface cure of at least about 80 percent. An ultraviolet light curable secondary matrix ribbonizing layer envelopes the primary matrix ribbonizing layers of the N optical fiber ribbon members. The secondary matrix ribbonizing layer material has a percent elongation to break greater than about 20 percent. The combination of the 80 percent surface cure of the primary matrix ribbonizing layers and the percent elongation to break greater than 20 percent of the secondary matrix ribbonizing layer provide an optical fiber multi-ribbon that has good handleability in terms of peeling of the secondary matrix ribbonizing layer from the primary matrix ribbonizing layer and good separation between the N optical fiber ribbons.

28 Claims, 2 Drawing Sheets

OTHER PUBLICATIONS

Design and Performance of a 3200–Fiber Hybrid SCR/U–Groove Cable Using 16–Fiber Ribbons, F.M. Sears, P.R. Bark, M.A. Clarke, H.G. Cooke, C.K. Eoll, L.E. Hermann, W. S. Jackman, R.O. Livingston, S.S. Sodhi, R.S. Wagman in International Wire & Cable Symposium Proceedings 1996 at p. 645.

Development of 3000–Fiber Cables With 8– and 16–Fiber Ribbons, N. Okada, T. Omori, K.

Development of 3000–Fiber Multi Slotted Core Cable, M. Hara, M. Saito, E. Konda, K. Nagai, M. Oku in International Wire & Cable Symposium Proceedings 1996 at p. 665.

Recorded Fiber–Count Cable Fits in Manhattan Ducts, from Lightwave, Aug. of 1996.

"Radiation Curable Coatings Containing Fluorinated Bisphenol a Diethylether Diacrylate", R. Bongiovanni, G. Malucelli, A. Priola, RadTech Europe 1997 Conference, poster Session, June 1997.

"Development of a Single–Slot 1000–Fiber Optical Cable", S. Miiyama, A. Nishimura, M. Watanabe, K. Takahashi, Y. Kitayama, Fujikura Technical Review, July 1996.

An Overview of Key Ribbon Handleability Attributes, G.A. Lochkovic, S.K. Moorjani, N.I.

Au, R. DeFabritis, C. Taylor in International Wire & Cable Symposium Proceedings 1997 at p. 274.

* cited by examiner

OPTICAL FIBER MULTI-RIBBON AND METHOD FOR MAKING THE SAME

BACKGROUND OF THE INVENTION

1. Field of the Invention

The present invention generally relates to optical fiber telecommunication cables. More particularly, the present invention relates to optical fiber multi-ribbon transmission elements for optical fiber telecommunications cables in which at least two independent optical fiber ribbons are adjacently disposed in a common plane and surrounded by a common exterior sheath.

2. Description of the Prior Art

Optical fiber cables are now widely used in the telecommunications field to transmit information. Optical fiber cables are frequently relying on optical fiber ribbons or multi-ribbons to achieve optimum packing density in high fiber count cables. Ribbonized fibers are chosen because they provide an organized structure which increases packing efficiency and permits rapid splicing and connectorization.

As the frequency of ribbonized fiber use has increased, the handleability of such ribbons has become very important. According to Lochovic et al., *An Overview of Key Ribbon Handleability Attributes*, International Wire & Cable Symposium Proceedings 1997, page 260, "handleability" is defined as the handling stages that a ribbon undergoes during installation and potential subsequent fiber access of a cable; beginning with the separation of a ribbon from the cable and concluding with the final fixation in the fiber optic system. According to this article, some of the attributes of handleability include: thermal strip; peelability; separability; furcatability; and robustness. The authors of the aforementioned article have found that manipulation of only the adhesion at the matrix and fiber interface to optimize peelability can degrade other handleability characteristics such as separability and robustness.

The optical fiber multi-ribbon of the present invention addresses the problems of peelability, splitability (also referred to as separability) and robustness which has been lacking in prior art optical fiber ribbons and multi-ribbons.

SUMMARY OF THE INVENTION

It is an object of the present invention to provide an optical fiber multi-ribbon which has good handleability characteristics.

It is a further object of the present invention to provide an optical fiber multi-ribbon which has good peelability and separability.

This object is accomplished, at least in part, by providing an optical fiber multi-ribbon comprising N, where N is an integer greater than one, optical fiber ribbon members arranged in a common plane. Each of the N optical fiber ribbon members further comprises a plurality of optical fibers arranged in a planar array and an ultraviolet light curable primary matrix ribbonizing layer enveloping the plurality of optical fibers. The primary matrix ribbonizing layer of at least one of the N optical fiber ribbon members has a surface cure of at least about 80 percent. An ultraviolet light curable secondary matrix ribbonizing layer envelops the primary matrix ribbonizing layers of the N optical fiber ribbon members. The secondary matrix ribbonizing layer material has a percent elongation to break greater than about 20 percent.

Other objects and advantages of the present invention will become apparent to those skilled in the art from the following detailed description read in conjunction with the attached drawings and claims appended hereto.

BRIEF DESCRIPTION OF THE DRAWINGS

The drawings, not drawn to scale, include.

DETAILED DESCRIPTION OF THE INVENTION

Figure 1B:
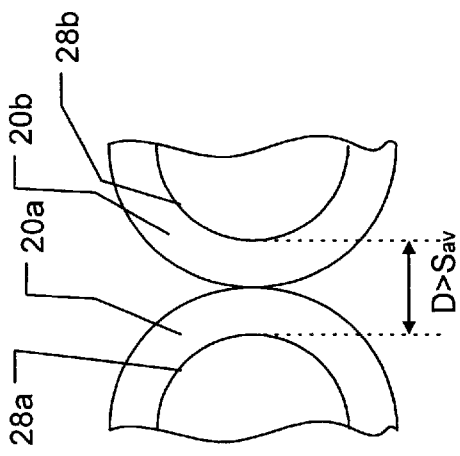
FIG. 1b, which is a partial schematic diagram illustrating adjacent end fibers enveloped by primary matrix ribbonizing layer.
Figure 1D:
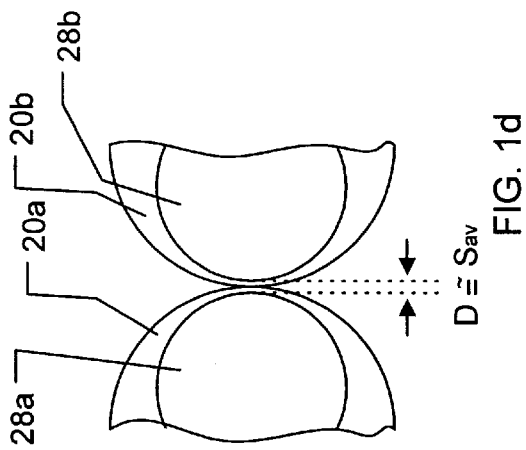
FIG. 1d, which is a partial schematic diagram illustrating adjacent end fibers enveloped by primary matrix ribbonizing layer.
Figure 1A:
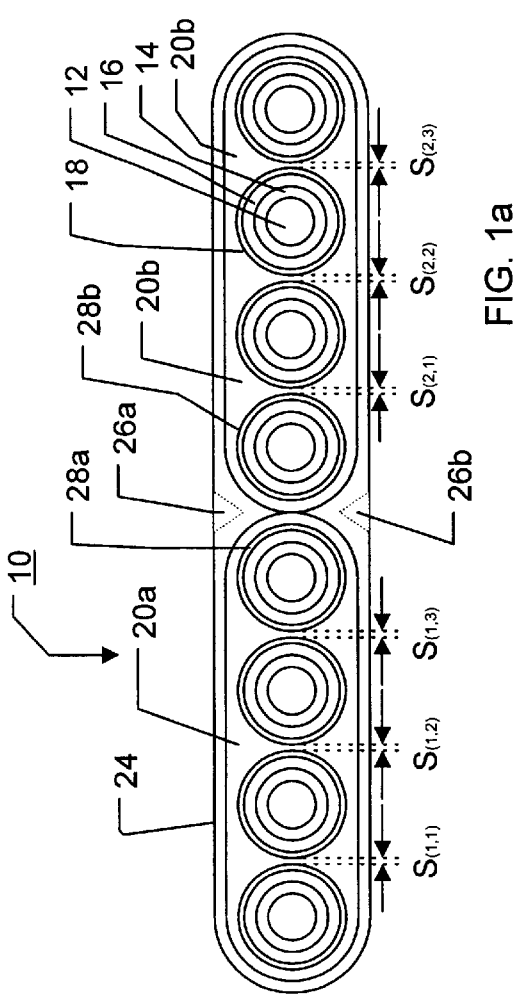
FIG. 1a, which is a simple schematic diagram illustrating one embodiment of an optical fiber multi-ribbon according to the present invention.

As described hereinafter, the present invention is an optical fiber multi-ribbon and method for making the same. A typical optical fiber multi-ribbon 10 embodiment is depicted in FIG. 1a. The multi-ribbon 10 comprises a plurality of optical fibers, such as 12, arranged in a common plane. Each of the fibers are coated with a primary coating comprising an inner layer 14 and outer layer 16. The primary coating is over coated with a color ink layer 18. Pigments may be provided in the outer layer 16 and the color ink layer 18 may be omitted, if desired. The fibers together with their coating layers are approximately 250 micro meters in diameter.

In the eight fiber count embodiment illustrated in FIG. 1a, primary matrix ribbonizing layers 20a and 20b are coated over the fibers so as to envelop them to create first and second optical fiber ribbon members. Primary matrix ribbonizing layer 20a envelops four adjacent fibers to form the first optical fiber ribbon member and primary matrix ribbonizing layer 20b envelops the remaining four adjacent fibers to form the second optical fiber ribbon member which is adjacent to the first optical fiber ribbon member.

In the embodiment illustrated in FIG. 1a, the optical fibers enveloped by the primary matrix ribbonizing layer 20a are spaced from each other so that their respective outermost layers are intentionally placed at a nominal distance S from each other which is typically 1 to 15 micro meters. However, under actual manufacturing conditions, the actual distance S between the outermost layers tends to vary somewhat. Accordingly, the actual distances between the outermost layers of adjacent fibers within the first optical fiber ribbon member are indicated as $S_{(1,1)}$, $S_{(1,2)}$ and $S_{(1,3)}$ and the actual distances between the outermost layers of adjacent fibers within the second optical fiber ribbon member are indicated as $S_{(2,1)}$, $S_{(2,2)}$ and $S_{(2,3)}$. Referring to the embodiment illustrated in FIGS. 1a and 1b, the primary matrix ribbonizing layers 20a, 20b are made such that their adjacent ends (hinge sections) have sufficient thickness to ensure that the outer most layers 28a, 28b of the adjacent end fibers of each ribbon member are spaced apart by a distance D, wherein D is greater than $S_{av}$, $S_{av}$ is the average distance between the outer most layers of the fibers in adjacent ribbon members.

For the embodiment illustrated in FIG. 1a, $S_{av}$ can be defined by the following expression:

$$S_{av} = \frac{S_{(1,1)} + S_{(1,2)} + S_{(1,3)} + S_{(2,1)} + S_{(2,2)} + S_{(2,3)}}{6} \quad (1)$$

Figure 1C:
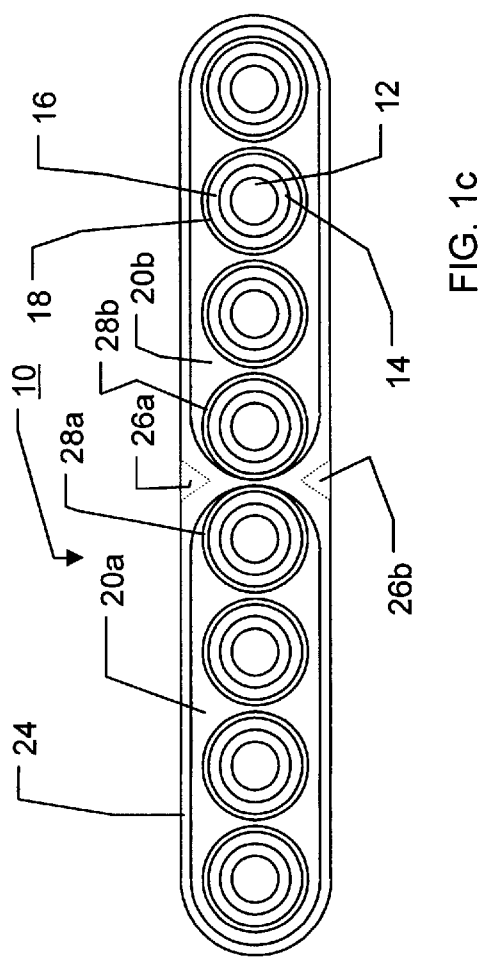
FIG. 1c, which a simple schematic diagram illustrating another embodiment of an optical fiber multi-ribbon according to the present invention.

This embodiment is easier to manufacture but is limited to certain splicing techniques. In the embodiment illustrated in FIG. 1c, the optical fibers enveloped by the first and second primary matrix ribbonizing layers 20a and 20b are spaced from each other so that their respective outermost layers are also at a nominal distance S from each other and under actual manufacturing conditions, the distance will vary somewhat. Referring to FIG. 1d, the primary matrix ribbonizing layers 20a, 20b are made such that their adjacent ends (hinge sections) have a thickness to ensure that the outermost layers 28a, 28b of the adjacent end fibers of each ribbon member are spaced apart by a distance D, wherein D is about equal to $S_{av}$. In this embodiment, it is intended that all fibers of the ribbon have substantially equal spacing between them regardless of the ribbon member in which such fibers belong. This ribbon is more difficult to manufacture but provides a ribbon which is easier to splice all fibers than the embodiment illustrated in FIGS. 1a and 1b.

Regardless of the embodiment of the primary matrix ribbonizing layers illustrated in FIGS. 1a–1d, a secondary matrix ribbonizing layer 24 is coated over the primary matrix ribbonizing layers 20a, 20b so as to envelop the first and second optical fiber ribbon members in a common plane. Both the primary and secondary matrix ribbonizing layers are formed from an ultraviolet light (UV) curable material, such as UV acrylates, which are well known in the art.

Figure 2:
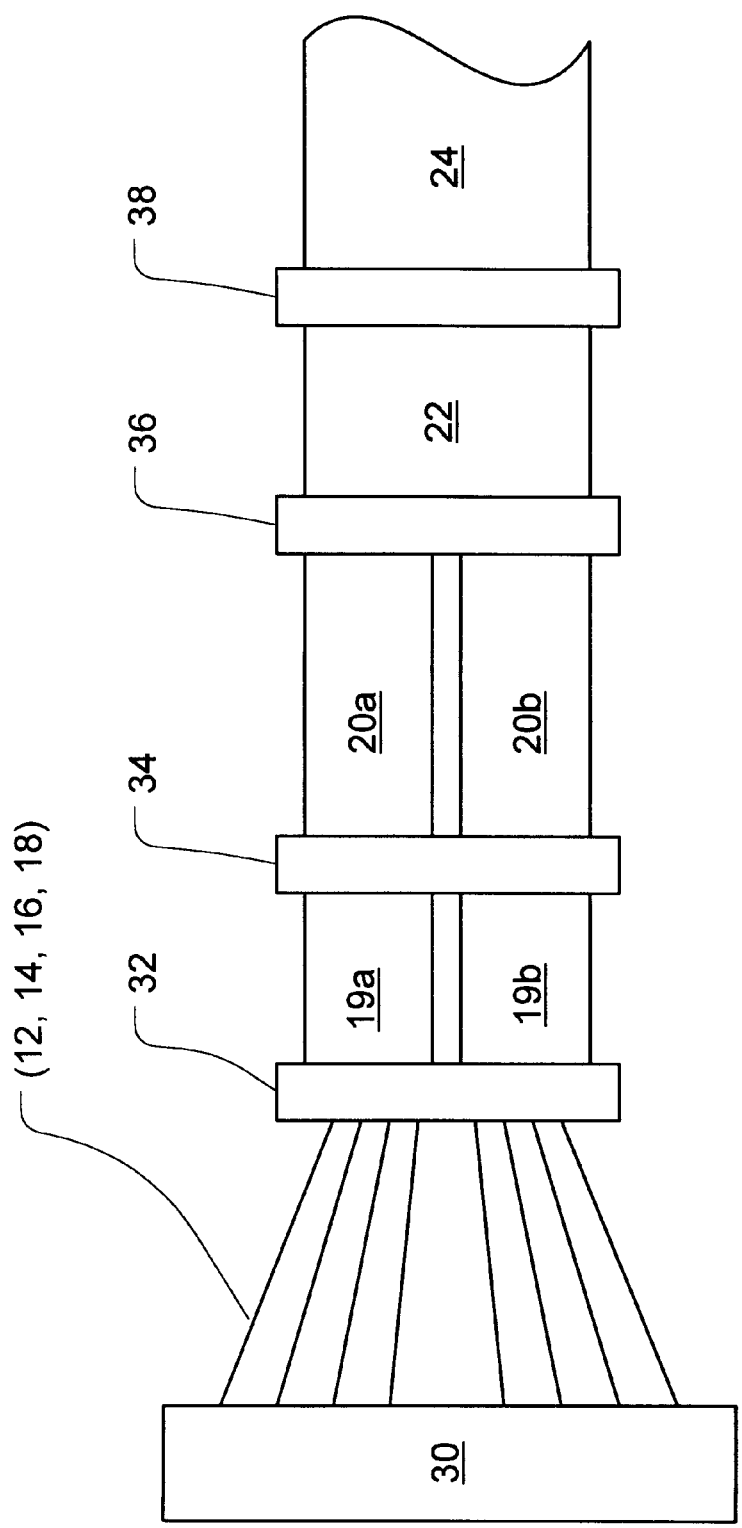
FIG. 2, which is a simple schematic illustration of the method for forming an optical fiber multi-ribbon of the present invention.

Referring to FIG. 2, the optical fiber multi-ribbon 10 is made by providing a plurality of coated optical fibers (12, 14, 16, 18) from a pay-off station 30 and arranging the plurality in planar arrays. The planar arrays of optical fibers are passed through a ribbon die 32 wherein a UV curable primary matrix ribbonizing layer material is coated there over to form uncured enveloping layers 19a, 19b over the planar arrays of fibers. The planar arrays, having the uncured enveloping layers 19a, 19b are passed through one or more UV curing light sources 34 which cause the UV curable matrix material to cure into cured primary matrix ribbonizing layers 20a, 20b so forming the first and second optical fiber ribbon members which are adjacent and lie in the same plane. The first and second optical fiber ribbon members are passed through a ribbon die 36 wherein a UV curable secondary matrix layer material is coated over the primary matrix ribbonizing layers 20a, 20b to form uncured enveloping layer 22 over the primary matrix layers 20a, 20b. The secondary matrix material layer 22 is cured by passing it through one or more UV curing light sources 38 which cause the UV curable matrix material to cure into the secondary matrix ribbonizing layer 24 so forming the multi-ribbon optical fiber 10.

The material properties, such as percent elongation to break and degree of curing for ribbons having different combinations of UV curable materials for the primary and secondary matrices ribbonizing layers was evaluated. According to the present invention, an optical fiber multi-ribbon 10 which provides good peelability of the secondary matrix ribbonizing layer 24 from the two primary matrix ribbonizing layers 20a, 20b and good splitability between the first and second ribbon members can be obtained when two conditions are satisfied. First, the primary matrix ribbonizing layer UV material needs to be cured, using ordinary curing methods, so as to have a minimum degree of surface curing of about 80 percent, and preferably about 90 percent, prior to the coating of the uncured secondary matrix layer material 22 there over. The degree of surface curing may be determined by the Fourier Transform Infrared Spectroscopy (FTIR) method generally described in Frantz et al., "Evaluation of Techniques for Determining the Extent of Cure of Optical Fiber Coatings", International Wire & Cable Symposium Proceedings, pages 134–139 (1991).

The degree of surface curing of a UV-curable acrylate material can be determined by its degree of acrylate unsaturation. The magnitude of the acrylate absorption peak (or area) at 810 cm$^{-1}$ indicates the degree of saturation. FTIR with attenuated total reflectance (ATR) (or microscope) technique is used. The peak selected to monitor the cure reaction is the C—H deformation vibration on the acrylic double bond at 810 cm$^{-1}$. The peak at 830 cm$^{-1}$ is not affected by the curing reaction and therefore can be chosen as an internal standard. To calculate the degree of cure, the sample has to be compared with the prepolymer (liquid or uncured resin) and fully cured references. The percent of surface cure is represented by the following equation:

$$\% \text{ cure} = \left[1 - \left(\frac{Rps - Rpc}{Rpl - Rpc}\right)\right] \times 100 \quad (2)$$

where Rps is the peak ratio of the sample tested, Rpc is the peak ratio of the fully cured resin, Rpl is the peak ratio of uncured liquid resin, and peak ratio is the peak area at 810 cm$^{-1}$ divided by the peak area at 830 cm$^{-1}$.

The above described method can be extended to use peak height, instead of peak area, of the spectra to determine the percent surface cure. For most acrylate based materials, the absorbance at 810 cm$^{-1}$ should be used. If the material contains a silicone or other ingredient which absorbs strongly at or near 810 cm$^{-1}$, an alternative acrylate absorbance wavelength should be used, such as 1410 cm$^{-1}$, 1510 cm$^{-1}$ or 1635 cm$^{-1}$. The method can also be extended to other UV curable materials such as cationic base, which may use the above method or others, such as described in the above referenced International Wire & Cable Symposium Proceedings, pages 134–139.

It is believed that when the degree of surface curing of the material forming the primary matrix ribbonizing layer is at least about 80 percent, and preferably above 90 percent, prior to the coating of the secondary matrix material there over to form the secondary matrix ribbonizing layer, there is very low chemical bonding potential between the primary layer matrix material and the secondary layer matrix material which partly contributes to the good peelability. In contrast, a low level of curing of the primary matrix material allows too many residual functional groups to react with the secondary layer matrix material during its UV curing step and therefore, significant chemical bonding occurs.

As the second condition, the cured secondary matrix ribbonizing layer material 24 should have a cured tensile elongation to break of at least about 20 percent, and preferably at least about 50 percent. Percent elongation to break can be measured using the testing procedures described in ASTM D638-89.

Among the combinations of materials tested, it was found that the UV curable acrylate material provided by DSM Desotech under its product nomenclature DSM 9-31 was suitable as the material for the primary matrix ribbonizing layer when it was cured so as to have a degree of surface curing of at least about 80 percent prior to the coating of the material forming the secondary matrix layer there over. Any UV curable acrylate material should work as the primary layer provided that a degree of surface curing of at least about 80 percent, and preferably above 90 percent, is achieved prior to the coating of the secondary layer matrix material there over. It was found that the UV curable acrylate material provided by Borden Chemicals under its product nomenclature 9MKU71645 was suitable for the secondary matrix ribbonizing layer when cured so as to have a percent elongation to break of at least about 20 percent and preferably above 50 percent. Also, any UV curable acrylate will work suitably as the secondary matrix ribbonizing layer provided that it can achieve a percent elongation to break of at least 20 percent once it is cured. Experience has shown, however, that the peelability results significantly improve if the percent elongation to break of the material is at least about 50 percent.

In an alternative embodiment, a typical release agent, may be applied to the cured primary matrix ribbonizing layers 20a, 20b prior to the coating of the uncured secondary matrix ribbonizing layer material 22 there over. Once the secondary matrix layer material is cured, the release agent remains in the interface between the primary matrix ribbonizing layers 20a, 20b and the secondary matrix ribbonizing layer 24. Only very small amounts, not more than 5 percent, and preferably less than 1 percent, by weight of release agent need to be applied, if release agents are used at all. Those skilled in the art will realize that the amount of release agent used should be minimized to the amount necessary to obtain the desired release of the secondary matrix material from the primary matrix material.

Materials that may be used as a release agent include any material which contributes to the release properties of the cured primary matrix ribbonizing layer from the secondary matrix ribbonizing layer. Release agents may comprise either nonreactive, reactive components or a combination of both. Reactive release agents include acrylated or methacrylated silicones, acrylic-functional polyester-modified dimethyl siloxanes, vinyl-functional and mercapto-functional fluorocarbons. These reactive materials bind with the reactive components of the primary matrix material during curing. Nonreactive release agents include silicone copolymers, paraffin, microcrystalline wax and non-reactive fluorocarbons.

In still yet another embodiment, the outer surface of the secondary matrix ribbonizing layer having the percent elongation to break greater than about 20 percent may be provided with a pair of opposing notches 26a, 26b (shown in dotted lines) located between the two enveloped ribbon members. The opposing notches 26a, 26b assist with the separation or splitting of the two enveloped ribbons from each other. Of course, those skilled in the art will now recognize that instead of opposing notches, only one notch may be provided in the matrix 24 to assist with separation, although preferably two opposing notches are used. The notches may be provided in the secondary matrix layer by forming appropriate fingers in the die which coats the uncured secondary matrix layer material 22 (FIG. 2) over the cured primary matrix ribbonizing layers 20a, 20b of the first and second optical fiber ribbon members. Alternatively, any mechanical or optical cutting means, such as a knife or laser, may be used to provide notches in the cured secondary matrix ribbonizing layer 24 after it is cured, if desired.

It can be seen from the foregoing disclosure and series of examples that the present invention offers substantial advantages. While a two ribbon member optical fiber multi-ribbon has been described and illustrated, those skilled in the art will appreciate that more than two ribbon members may be employed without departing from the scope of the invention.

Accordingly, the embodiments disclosed herein achieve the object of the invention; however, it should be appreciated by those skilled in the art that departures can be made from the following claims without parting from the spirit and scope of the invention.

What is claimed is:

1. An optical fiber multi-ribbon, the multi-ribbon comprising:
    a first optical fiber ribbon member further comprising:
        a first plurality of optical fibers arranged in a planar array, each of the optical fibers having an outermost coating layer;
        an ultraviolet light curable primary matrix ribbonizing layer enveloping the first plurality of optical fibers, wherein the material forming the primary matrix ribbonizing layer has a surface cure of at least about 80 percent;
    a second optical fiber ribbon member arranged adjacent to and in the same plane as the first optical fiber ribbon member, the second optical fiber ribbon member further comprising:
        a second plurality of optical fibers arranged in a planar array, each of the optical fibers having an outermost coating layer;
        an ultraviolet light curable primary matrix ribbonizing layer enveloping the second plurality of optical fibers, wherein the material forming the primary matrix ribbonizing layer has a surface cure of at least about 80 percent;
    an ultraviolet light curable secondary matrix ribbonizing layer enveloping the primary matrix ribbonizing layers of the first and second optical fiber ribbon members, the secondary matrix ribbonizing layer having a percent elongation to break greater than about 20 percent.

2. The optical fiber multi-ribbon of claim 1, wherein the secondary matrix ribbonizing layer material has a percent elongation to break greater than about 50 percent.

3. The optical fiber multi-ribbon of claim 1, wherein a release agent is provided between the primary matrix ribbonizing layers and the secondary matrix ribbonizing layer.

4. The optical fiber multi-ribbon of claim 3, wherein the secondary matrix ribbonizing layer material has a percent elongation to break greater than about 50 percent.

5. The optical fiber multi-ribbon of claim 1, wherein a notch is provided in the secondary matrix ribbonizing layer between the first and second optical fiber ribbon members.

6. The optical fiber ribbon of claim 1, wherein a pair of opposing notches are provided in the secondary matrix ribbonizing layer between the first and second optical fiber ribbon members.

7. The optical fiber ribbon of claim 1, wherein the first plurality of optical fibers enveloped by the primary matrix ribbonizing layer are spaced from each other so that their respective outermost coating layers are at a nominal distance S from each other;
    wherein the second plurality of optical fibers enveloped by the primary matrix ribbonizing layer are spaced from each other such that their respective outermost coating layers are at a nominal distance S from each other; and
    wherein the primary matrix ribbonizing layers of the first and second optical fiber ribbon members are made such that the adjacent ends of the respective matrix ribbonizing layers have sufficient thickness to ensure that the outermost layers of adjacent end fibers of each ribbon member are spaced apart by a distance D, wherein D is greater than $S_{av}$, where $S_{av}$ is the average distance between the outermost layers of the optical fibers of both the first and second optical fiber ribbon members.

8. The optical fiber ribbon of claim 1, wherein the first plurality of optical fibers enveloped by the primary matrix ribbonizing layer are spaced from each other so that their respective outermost coating layers are at a nominal distance S from each other;

wherein the second plurality of optical fibers enveloped by the primary matrix ribbonizing layer are spaced from each other such that their respective outermost coating layers are at a nominal distance S from each other; and wherein the primary matrix ribbonizing layers of the first and second optical fiber ribbon members are made such that the adjacent ends of the respective matrix ribbonizing layers have sufficient thickness to ensure that the outermost layers of adjacent end fibers of each ribbon member are spaced apart by a distance D, wherein D is about the same as $S_{av}$, where $S_{av}$ is the average distance between the outermost layers of the optical fibers of both the first and second optical fiber ribbon members.

9. A method for making an optical fiber multi-ribbon, the method comprising the steps of:

providing a first plurality of optical fibers;

arranging the first plurality in a planar array;

providing an ultraviolet light curable primary matrix ribbonizing layer material over the array of first plurality of optical fibers so as to envelop them;

curing the primary matrix ribbonizing layer material to a surface cure of at least about 80 percent to form a first optical fiber ribbon member;

providing a second plurality of optical fibers;

arranging the second plurality in a planar array;

providing an ultraviolet light curable primary matrix ribbonizing layer material over the array of second plurality of optical fibers so as to envelop them;

curing the primary matrix ribbonizing layer material to a surface cure of at least about 80 percent to form a second optical fiber ribbon member;

arranging the first and second optical fiber ribbon members so as to be adjacent to each other and so that they lie in a common plane;

providing an ultraviolet light curable secondary matrix ribbonizing layer material over the cured primary matrix ribbonizing layer materials of first and second optical fiber ribbon members so as to envelop them; and curing the secondary matrix ribbonizing layer material so that the resulting cured secondary matrix ribbonizing layer material has a percent elongation to break greater than about 20 percent.

10. The method of claim 9, wherein the step of curing the secondary matrix ribbonizing layer material is carried out so that the cured secondary matrix ribbonizing layer material has a percent elongation to break greater than about 50 percent.

11. The method of claim 9, wherein a release agent coating is provided over the cured primary matrix ribbonizing layer material of at least one of the optical fiber ribbon members prior to providing the secondary matrix ribbonizing layer material there over.

12. The method of claim 9, wherein a release agent coating is provided over the cured primary matrix ribbonizing layer material of the first and second optical fiber ribbon members prior to providing the secondary matrix ribbonizing layer material there over.

13. The method of claim 9, wherein a notch is provided in the secondary matrix ribbonizing layer material between the first and second optical fiber ribbon members.

14. The method of claim 13, wherein the notch is formed in the uncured secondary matrix layer during the step of providing the secondary matrix ribbonizing layer material over the primary matrix ribbonizing layer material.

15. The method of claim 13, wherein the notch is formed in the cured secondary matrix ribbonizing layer material.

16. The method of claim 9, wherein a pair of opposing notches are provided in the secondary matrix ribbonizing layer material between the first and second optical fiber ribbon members.

17. The method of claim 16, wherein the opposing notches are formed in the uncured secondary matrix ribbonizing layer material during the step of providing the secondary matrix ribbonizing layer material over the primary matrix ribbonizing layer material.

18. The method of claim 16, wherein the opposing notches are formed in the cured secondary matrix ribbonizing layer material.

19. An optical fiber multi-ribbon made according to the method of claim 9.

20. An optical fiber multi-ribbon, the multi-ribbon comprising:

N, where N is an integer greater than one, optical fiber ribbon members arranged in a common plane, each of the N optical fiber ribbon members further comprising:

a plurality of optical fibers arranged in a planar array;

an ultraviolet light curable primary matrix ribbonizing layer enveloping the plurality of optical fibers, wherein the material forming the primary matrix ribbonizing layer material of at least one of the N optical fiber ribbon members has a surface cure of at least about 80 percent;

an ultraviolet light curable secondary matrix ribbonizing layer enveloping the primary matrix ribbonizing layers of the N optical fiber ribbon members, the secondary matrix layer having a percent elongation to break greater than about 20 percent.

21. The optical fiber multi-ribbon of claim 20, wherein the secondary matrix ribbonizing layer material has a percent elongation to break greater than about 50 percent.

22. The optical fiber multi-ribbon of claim 20, wherein a release agent is provided between the primary matrix ribbonizing layer of at least one of the N optical fiber ribbon members and the secondary matrix ribbonizing layer.

23. The optical fiber multi-ribbon of claim 20, wherein a release agent is provided between the primary matrix ribbonizing layer of all N optical fiber ribbon members and the secondary matrix ribbonizing layer.

24. The optical fiber multi-ribbon of claim 20, wherein the secondary matrix ribbonizing layer material has a percent elongation to break greater than about 50 percent.

25. The optical fiber multi-ribbon of claim 20, wherein at least one notch is provided in the secondary matrix ribbonizing layer between two adjacent optical fiber ribbon members.

26. The optical fiber multi-ribbon of claim 20, wherein at least one pair of opposing notches are provided in the secondary matrix ribbonizing layer between two adjacent optical fiber ribbon members.

27. The optical fiber ribbon of claim 20, wherein the plurality of optical fibers enveloped by the N matrix ribbonizing layers are spaced from each other so that their respective outermost coating layers are at a nominal distance S from each other; and wherein the primary matrix ribbonizing layers of the N optical fiber ribbon members are made such that the adjacent ends of the respective matrix ribbonizing layers have sufficient thickness to ensure that the outermost layers of adjacent end fibers of each ribbon member are spaced apart by a distance D, wherein D is greater than $S_{av}$, where $S_{av}$ is the average distance between the outermost layers of the optical fibers of the N optical fiber ribbon members.

28. The optical fiber ribbon of claim 20, wherein the plurality of optical fibers enveloped by the N primary matrix ribbonizing layers are spaced from each other so that their respective outermost coating layers are at a nominal distance S from each other; and wherein the primary matrix ribbonizing layers of the N optical fiber ribbon members are made such that the adjacent ends of the respective matrix ribbonizing layers have sufficient thickness to ensure that the outermost layers of adjacent end fibers of each ribbon member are spaced apart by a distance D, wherein D is about the same as $S_{av}$, where $S_{av}$ is the average distance between the outermost layers of the optical fibers of the N optical fiber ribbon members.

* * * * *

UNITED STATES PATENT AND TRADEMARK OFFICE
CERTIFICATE OF CORRECTION

PATENT NO. : 6,175,677 B1
DATED : January 16, 2001
INVENTOR(S) : Houching M. Yang et al.

It is certified that error appears in the above-identified patent and that said Letters Patent is hereby corrected as shown below:

Title page,
Item [56], "References Cited - U.S. PATENT DOCUMENTS",
"4,592,985" should be -- 4,592,955 --.

"OTHER PUBLICATIONS",

Column 2,
The third reference is incomplete and should be:

-- *An Overview of Key Ribbon Handleability Attributes*, G.A. Lochkovic, S.K. Moorjani, N.I. Patel, R.J. Speights, B. L. Stephens in International Wire & Cable Symposium Proceedings 1997 at p. 260. --

The fourth reference is incomplete and should be:

-- *UV Color Coatings and Matrix Material Design for Enhanced Fiber Optic Ribbon Products*, K. Konstadinidis, N. Sollenberger, S. Siddiqui, K. Jackson, J. Turnipseed, T.W. Au, R. DeFabritis, C. Taylor in International Wire & Cable Symposium Proceedings 1997 at p. 274, November 17, 1997. --

Signed and Sealed this

Twentieth Day of November, 2001

*Attest:*

NICHOLAS P. GODICI
*Attesting Officer*    *Acting Director of the United States Patent and Trademark Office*